(12) United States Patent
Schnitzspan

(10) Patent No.: US 11,259,903 B2
(45) Date of Patent: Mar. 1, 2022

(54) PASSIVE FIT OF IMPLANT BRIDGES AND IMPLANT BARS BY MEANS OF A CAD/CAM TOOL FOR THE MODEL-FREE CREATION OF IMPLANT-SUPPORTED RESTORATIONS

(71) Applicant: DENTSPLY SIRONA inc., York, PA (US)

(72) Inventor: Paul Schnitzspan, Frankfurt (DE)

(73) Assignee: DENTSPLY SIRONA INC., York, PA (US)

( * ) Notice: Subject to any disclaimer, the term of this patent is extended or adjusted under 35 U.S.C. 154(b) by 45 days.

(21) Appl. No.: 15/552,162

(22) PCT Filed: Feb. 19, 2016

(86) PCT No.: PCT/EP2016/053506
§ 371 (c)(1),
(2) Date: Aug. 18, 2017

(87) PCT Pub. No.: WO2016/131939
PCT Pub. Date: Aug. 25, 2016

(65) Prior Publication Data
US 2018/0042707 A1     Feb. 15, 2018

(30) Foreign Application Priority Data
Feb. 19, 2015   (DE) .......................... 102015203031.8

(51) Int. Cl.
*A61C 13/00* (2006.01)
*A61C 13/225* (2006.01)
(Continued)

(52) U.S. Cl.
CPC ........ *A61C 13/0004* (2013.01); *A61C 8/0048* (2013.01); *A61C 8/0051* (2013.01);
(Continued)

(58) Field of Classification Search
CPC ............ A61C 13/0004; A61C 13/2255; A61C 8/0048; A61C 8/0051; A61C 8/0069;
(Continued)

(56) References Cited

U.S. PATENT DOCUMENTS

| 5,885,078 A | 3/1999 | Cagna |
| 6,056,547 A * | 5/2000 | Names ................. A61C 8/0001 433/173 |

(Continued)

FOREIGN PATENT DOCUMENTS

| WO | 199820806 A1 | 5/1998 |
| WO | WO-2013041382 A1 * | 3/2013 ........... A61C 8/0001 |

(Continued)

OTHER PUBLICATIONS

Frick Kristofer, Method for Manufacturing a Dental Superstructure, Machine translation of WO2013041382 specificaiton , Publication 2013.*

(Continued)

*Primary Examiner* — Cris L. Rodriguez
*Assistant Examiner* — Mirayda A Aponte
(74) *Attorney, Agent, or Firm* — Dentsply Sirona Inc.

(57) ABSTRACT

The invention relates to a specimen part for creating a stress-free fit, a so-called passive fit, of implant-supported and/or abutment-supported bridges and bars by means of a CAD/CAM tool for the creation of restorations, and to a method for creating a restoration from a digital model of a patient's jaw provided with at least two implants and/or abutments. The model is determined by means of an intraoral scan. In order to improve the precision of restorations and to shorten the production process, provision is made that the specimen part per implant and/or abutment has a scannable structure, preferably at a defined distance and angle to the implant and/or abutment.

18 Claims, 2 Drawing Sheets

(51) Int. Cl.
*A61C 8/00* (2006.01)
*A61C 9/00* (2006.01)

(52) U.S. Cl.
CPC ........ *A61C 8/0069* (2013.01); *A61C 13/2255* (2013.01); *A61C 8/0018* (2013.01); *A61C 9/004* (2013.01)

(58) Field of Classification Search
CPC ..... A61C 8/0015; A61C 9/004; A61C 8/0018; A61C 8/0001; A61C 8/009; A61C 1/084; A61B 17/176; A61B 2017/568
USPC ..... 433/173–174, 29, 37, 42, 43, 44, 50, 53, 433/54, 56, 57, 68, 196
See application file for complete search history.

(56) References Cited

U.S. PATENT DOCUMENTS

| | | | |
|---|---|---|---|
| 6,692,254 B1 | 2/2004 | Kligerman | |
| 6,905,336 B2* | 6/2005 | Summers | A61C 8/0001 |
| | | | 433/173 |
| 7,699,611 B2 | 4/2010 | Feijtiel | |
| 8,905,757 B2* | 12/2014 | Kats | A61C 9/0006 |
| | | | 433/74 |
| 2004/0142300 A1* | 7/2004 | Aravena | A61C 1/084 |
| | | | 433/76 |
| 2006/0291968 A1* | 12/2006 | Greenberg | A61C 1/084 |
| | | | 408/202 |
| 2007/0281283 A1* | 12/2007 | Lundgren | A61B 17/7008 |
| | | | 433/214 |
| 2009/0325125 A1 | 12/2009 | Diangelo | |
| 2010/0099058 A1* | 4/2010 | Wang | A61C 13/0004 |
| | | | 433/173 |
| 2012/0189985 A1* | 7/2012 | Iglesias | A61C 8/0048 |
| | | | 433/174 |
| 2013/0302752 A1* | 11/2013 | Schneider | A61C 1/084 |
| | | | 433/173 |

FOREIGN PATENT DOCUMENTS

| | | | | |
|---|---|---|---|---|
| WO | 2014117871 A1 | 8/2014 | | |
| WO | WO-2014117871 A1 * | 8/2014 | ........... | A61C 9/0053 |

OTHER PUBLICATIONS

International Search Report; PCT/EP2016/053506; Jun. 15, 2016 (completed); dated Jun. 24, 2016.
International Preliminary Report on Patentability; PCT/EP2016/053506; dated Aug. 31, 2017.
Written Opinion of the International Searching Authority; PCT/EP2016/053506; Jun. 15, 2016 (completed); dated Jun. 24, 2016.

* cited by examiner

PASSIVE FIT OF IMPLANT BRIDGES AND IMPLANT BARS BY MEANS OF A CAD/CAM TOOL FOR THE MODEL-FREE CREATION OF IMPLANT-SUPPORTED RESTORATIONS

Passive fit of implant bridges and implant bars by means of a CAD/CAM tool for the model-free creation of implant-supported restorations.

TECHNICAL FIELD

The invention relates to a specimen part for creating a stress-free fit—a so-called passive fit—of implant-supported and/or abutment-supported bridges and bars by means of a CAD/CAM tool for the creation of restorations.

The invention furthermore relates to a method for creating a restoration from a digital model of a patient's jaw provided with at least two implants and/or abutments, wherein the model is determined by means of an intraoral scan.

BACKGROUND OF THE INVENTION

In the production of implant-supported bridges and bars, fitting problems often occur at the transitions/connections to the implants. These fitting problems have various causes. They generally relate to both the conventional production and the CAD/CAM-supported production of the restoration.

In the same way, such problems can also occur in restorations mounted on teeth—so-called abutments or posts. The existing teeth of a patient are used for mounting, for which they are ground in a known fashion. Hybrid forms of abutments and implants are also possible for mounting the restoration.

In conventional methods, such as the casting technique, it cannot be avoided technically that significant deformations of the restoration occur in the cooling phase. In CAD/CAM methods, imprecisions in the digitalization of the implant positions caused by imprecisions in the scanning process can occur. These imprecisions primarily affect patients with edentulous jaws, for which the correlation of the individual image fields is difficult, due to the lack of structure in the jaw. Errors can furthermore occur when the impression is taken and the master model is created, and the implant positions are transferred into the master model. The latter error relates to both conventional and CAD/CAM methods, if working with a master model. A purely digital intraoral impression is too imprecise as a result of the state of the art with respect to the precision of the image registration and the size of the image field of the intraoral scanner.

The fitting problems can result in serious problems, viz., for example, a cost-intensive new production of the restoration, a fracture and/or loss of the restoration, or an infection at the marginal gap between the restoration and the implant, or can generate pain that is caused by stresses and leads to the loss of the implant as a result of stresses or infections.

The goal of any dentist or dental technician is therefore to achieve the so-called passive fit. In implant restorations, passive fit means a stress-free fit with no—or a slight, medically-acceptable—marginal gap between the restoration and the implant.

There are several possibilities for circumventing the problem. In doing so, a distinction must be made as to whether it is the deformation problems in the casting techniques, or the errors in the transfer of the implant positions, that are to be overcome.

If the dental technician creates the restoration using casting techniques, the technician places the restoration onto the master model with implant analogs after the cooling phase. If the restoration does not fit onto the implants, the technician can then remedy the defect either by means of spark erosion or in accordance with one of the methods known from WO 98/20806 A1.

In case of the spark erosion, the fit of the implant restoration is passivated in a dielectric by means of spark erosion. Electrodes that perfectly match the structure of the implants are placed in the position of the laboratory analogs. The connection to a direct-current source brings about a metal removal from the implant restoration to the electrodes. After the process is completed, the restoration fits perfectly on the laboratory analogs. A fit to the master model is thereby achieved.

Alternatively, the non-fitting restoration can be separated above the implants. The separated parts with the implant connection are screwed into the implants, i.e., laboratory analogs in the master model. The upper part of the restoration is then brought into a position above the implants and joined together with the separated, screwed parts—for example, by soldering, welding, or spark erosion.

Transfer errors in the implant positions are remedied by cementing with additional parts in the mouth.

A variant for achieving the passive fit is the use of so-called multi-unit abutments (MU abutments) with adhesive caps. In this case, a multi-unit abutment is screwed into each implant. So-called adhesive caps having a conical shape toward the top are screwed onto the MU abutments. The restoration is placed onto these adhesive caps and cemented intraorally with the adhesive caps. The adhesive caps have a screw fit and are screwed to the MU abutments. As a result of the adhesive gap between the restoration and the adhesive caps, imprecisions can be compensated for up to a certain extent.

Finally, imprecisions in the fit can be remedied by a vertical separation and rejoining.

In the vertical separation, a principle similar to that in the horizontal separation is applied. However, in this case, the restoration is not separated above the implants, but vertically, between the implants. The individual parts are then separately screwed onto the laboratory analogs in the master model, and the parts are again joined—for example, by soldering or welding or cementing. One variant is to cement the separated restoration in the mouth of the patient and to send the cemented restoration back to the technician for finalization, or, if necessary, for recreation with the correct relation between the implant positions.

In order to avoid such corrections, which often also cause mechanical weaknesses, the traditional casting technique for the production of multi-unit bridge frameworks has largely been replaced in the last few years by computer-aided manufacturing. Casting alloys with potential structural inhomogeneity and imprecise fit are no longer used as framework material. Instead, industrially prefabricated, homogeneous blocks made of metals and ceramics, such as titanium and zirconia, are used, from which the framework is milled. The computer-aided production chain of tooth-supported and implant-supported reconstructions reduces the number of manual working steps, and thus the possibilities of manual processing errors. Such a method is known from DIGITAL_DENTAL.NEWS, 8th volume, January/February 2014, PD Dr. Joannis Katsoulis: "Fitting precision of Implant-supported CAD/CAM Reconstructions," from which the present invention proceeds.

In the previously known method, the jaw of the patient provided with implants or with prepared ground holding teeth is initially intraorally cast, or a data model of the jaw is created by means of an intraoral scan. On this basis, a master model is initially produced, which is digitalized with scan abutments on the implant analogs and/or abutment teeth by means of an extra-oral scan, in order to capture the surface in detail. The data generated by the digitalization can be imported into various CAD/CAM systems and used further. This first digitalization step of the model, including the opposite jaw and the jaw relation, is sufficient for the digital design of individual crowns. For multi-unit, tooth-supported or implant-supported bridge frameworks, a physical preform of the framework, i.e., a so-called WAX-UP, is often still produced in a traditional manner by the technician, and then scanned. The framework scan is then digitally combined with the master model and adapted to the definitive shape by means of CAD.

Alternatively, the intended complete tooth shape is, like a setup or by digitalization of the initial situation, i.e., scanned, and then reduced to a ceramic-supported framework using construction software. The desired fully-anatomical shape of the restoration can also be constructed virtually and then reduced. For removable implant-supported bar works, the definitive tooth positioning—the so-called setup—generally takes place as a second scan, which tooth positioning is then superimposed and makes possible the free CAD design of a bar.

The aim of the invention is to propose a method for producing implant-supported and/or abutment-supported restorations, which method significantly reduces the manufacturing process and allows for a better precision in the restorations produced.

It is also the aim of the invention to specify a specimen part, as well as an implant-supported restoration, with better precision.

SUMMARY OF THE INVENTION

This aim is achieved by a specimen part for creating a stress-free fit—a so-called passive fit—of implant-supported and/or abutment-supported bridges and bars by means of a CAD/CAM tool for the creation of restorations, in which fit the specimen part per implant and/or abutment has a scannable structure—preferably, at a defined distance and angle to the implant and/or abutment.

The specimen part is initially manufactured on the basis of an intraoral three-dimensional scan of a jaw provided with implants and/or ground abutment teeth. The specimen part manufactured in this way is placed onto the jaw for the try-on and/or screwed together with the implants. In case mechanical stresses occur between the specimen part and the jaw, the specimen part can be divided and rejoined. If the specimen part then has a stress-free fit, it can be scanned again, either intraorally or extra-orally. In the process, scannable structures, their position, distance, and/or orientation toward one another are used as precise references for position correction and serve to correct the original digital model of the jaw and/or the specimen part. As a result of the specimen part having a separating portion/point joined preferably by cementing, mechanical stresses caused by the fit can, advantageously, be removed.

One embodiment of the invention provides that the scannable structure be a tapering prism—preferably, a tetrahedron. The tip of such a multi-surface body can be detected in the scan particularly well, with low uncertainty. The corrections of the digital model carried out based upon the known relative positions are, then, correspondingly precise.

It is additionally advantageous if the specimen part is provided on a segment, located between two implants and/or abutments, with a scannable structure—preferably, a two-dimensional milled structure. Such a linear structure also increases the precision of the digital model between the previously described reference points.

In another embodiment of the invention, the specimen part can, advantageously, be easily, hygienically, and comfortably fitted, if it is manufactured from plastic—preferably, from polymethyl methacrylate PMMA. The specimen part can, in particular, be produced from polymethyl methacrylate (PMMA) with the required precision by 3-D-printing or by CAM.

Another embodiment of the specimen part according to the invention provides that it have a screw channel for each implant. Laboratory analogs and/or abutments, which allow for the precise fitting trial of the restoration on the specimen part and/or of the specimen part on the jaw, can be screwed into the screw channels.

The aim of the method is achieved by a method for creating a restoration from a digital model of a patient's jaw provided with at least two implants and/or abutment teeth, wherein the model is determined by means of an intraorally-created scan, in that a specimen part is created from the model by means of CAD/CAM—preferably, from plastic—and the specimen part is checked for its dimensional stability with respect to at least two implants and/or abutment teeth and, if necessary, corrected by separating and stress-free rejoining, and in that the specimen part is then scanned and a digital model of the possibly changed specimen part and/or of the jaw is generated, which digital model is used to produce a restoration manufactured by means of CAD/CAM or 3-D printed. In order to adapt the specimen part, a separation preferably takes place between at least two implants and/or abutments, which separation is connected by subsequent stress-free joining—preferably, by casting or cementing.

In one embodiment of the method, a specimen part is initially produced, in order to remove any imprecisions in the scan by separating and rejoining. The specimen part is provided with screw channels for each implant, in order to insert abutments and/or laboratory analogs. By means of the latter, the fitting in the jaw can initially be determined, and/or the fitting of the restoration can be checked.

Another embodiment of the method provides that a suitable, scannable basic shape connected to the specimen part be provided at a predetermined distance and angle to each implant and/or abutment, so that a corresponding correction of the digital model of the jaw and/or of the specimen part can take place by scanning, after the correction of the specimen part. During scanning, the scannable basic shapes and their precise positions serve as reference points, the position change of which is used as the basis for the correction calculations.

In order to further improve the precision, another embodiment of the method provides that the specimen part be provided with at least one scannable—preferably, two- or three-dimensional—structure—in particular, on the bars between two implants and/or abutments. The linear, scannable structure makes possible a more precise correction of the digital model, even between the reference points.

The initial digital model of the jaw is, advantageously, more precise if the intraoral scan is created using scan bodies that have a known shape and known dimensions, and are connected to the implants and/or abutments. Particularly in largely edentulous jaws, the precision of the initial model can suffer due to missing structures. The scan bodies replace missing structures and, as a result of their positions and dimensions, allow for conclusions regarding the course of the jaw arch, so that the created digital model turns out to be significantly more precise.

Another embodiment of the method provides that the scanning of the changed specimen part take place extraorally. The time required of the patient is thus advantageously reduced.

The measure whereby a piece of information regarding the position of a separating point is entered into the digital model of the specimen part also serves to improve the precision.

Such a point of discontinuity can then be appropriately taken into consideration in the correction calculation.

If the restoration and/or the specimen part is created by means of stereolithographic methods, the entire production process can, advantageously, take place in an automated fashion.

The production of the restoration is thus designed as follows: The dentist or dental technician takes digital impressions of the patient's mouth using a suitable intraoral scanner and thus creates a digital model of the jaw arches. In doing so, he uses suitable scan bodies, which are screwed into the implants in order to capture the position of the implants. In the CAD/CAM software, the positions of the implants are captured based upon the digitalized scan bodies, and a digital model of a specimen part, the physical embodiment of which model is described further below, is created in a CAD-supported manner. This specimen part is manufactured directly from the digital model by the dentist in either a CAM-supported or stereolithographic manner, if the dentist has a suitable 5-axis machine or other suitable machines available. Alternatively, the model can be sent digitally to a dental technician, who has a suitable 5-axis machine. During the production from a material block using machining processes, a 5-axis machine is required, since several divergent implants are generally present. In the latter case, the dental technician sends the manufactured specimen part back to the dentist. The material of the specimen part is a suitable hard plastic, such as PMMA.

The structure of the specimen part is characterized as follows:

Per implant, the specimen part has a screw channel and a scannable structure, such as tetrahedron-like, commercially available scan bodies, at a defined distance to the implant. This scannable surface can be a tetrahedron that the software can easily detect as a pattern. The specimen part furthermore comprises a milled structure on each bar, which milled structure simplifies image registration or makes it less error-prone than in the edentulous patient's mouth.

The specimen part is placed into the patient's mouth, and it is attempted to screw it into the implants. If the specimen part fits perfectly, the dental technician can be instructed to create the final restoration. If the specimen part does not fit, the dentist vertically separates, in a separation similar to the one known from WO001998020806 A1, those bars that do not fit, so that individual segments result. The segments are individually screwed onto the implants in the patient's mouth and are joined again, e.g., cemented, in the patient's mouth.

After curing of the cement, the joined specimen part is again removed from the patient's mouth. The software offers the dentist a program interface—a so-called tool—with which he can specify, in the software on the digital model of the specimen part, where he has physically separated the specimen part. This tool is a simple cutting tool known from CAD programs. Now, the dentist either scans the joined specimen part again or sends the part to the dental technician for digitalization. After the digitalization of the specimen part, the dental technician clicks on the special scan body-like structures on the image of the specimen part produced by scanning, in order to detect and mark the implant positions as they precisely correspond to the positions in the patient's mouth. Since the dentist has already specified digitally where the separation has taken place, the software automatically knows which bars of the specimen part were changed. Accordingly, the implant positions of the changed bars are adapted automatically. The dental technician now has the positions of the implants in the digital model of the software, viz., such that they correspond very precisely to the situation in the patient's mouth. The dental technician can, accordingly, start with the actual production of the restoration. The remaining errors consist in the machine imprecision and, essentially, in the imprecision of the recording of the individual images. The problem of the difficult image registration in edentulous mouths of patients, and the imprecision in the creation of the plaster model and the transfer of the implant positions into this plaster model, are eliminated by this invention.

The procedure with ground post teeth or abutment teeth, which can also alternate with implants, is analogously designed.

The digital model of the specimen part corrected by means of the specimen part and/or the corrected digital model of the jaw arch with the precise positions of the implants or abutments can then be used for the CAD-supported finalization of a digital model of the restoration.

If the technician needs a digital model for aesthetic veneering, he can also create it digitally, e.g., by means of software, such as ModelGen, and produce it in a CAM-supported manner or have it created at a production center.

The use of the specimen part allows for a model-free, digital production process of precisely-fitting implant restorations. The dentist does not need to take an impression and also does not need to create a transfer key for the transfer of the implant positions. The specimen part replaces the customary, error-prone transfer key. The dental technician does not need to create a master model made of plaster. Costs and time in the production process can be saved thereby. If the dental technician requires a model for aesthetic veneering, he can create it digitally in accordance with the SLA method with laboratory analogs, or have it produced.

BRIEF DESCRIPTION OF THE DRAWINGS

The method according to the invention and the apparatus according to the invention are explained using the drawings. Shown are.

DETAILED DESCRIPTION OF THE INVENTION

Figure 1:
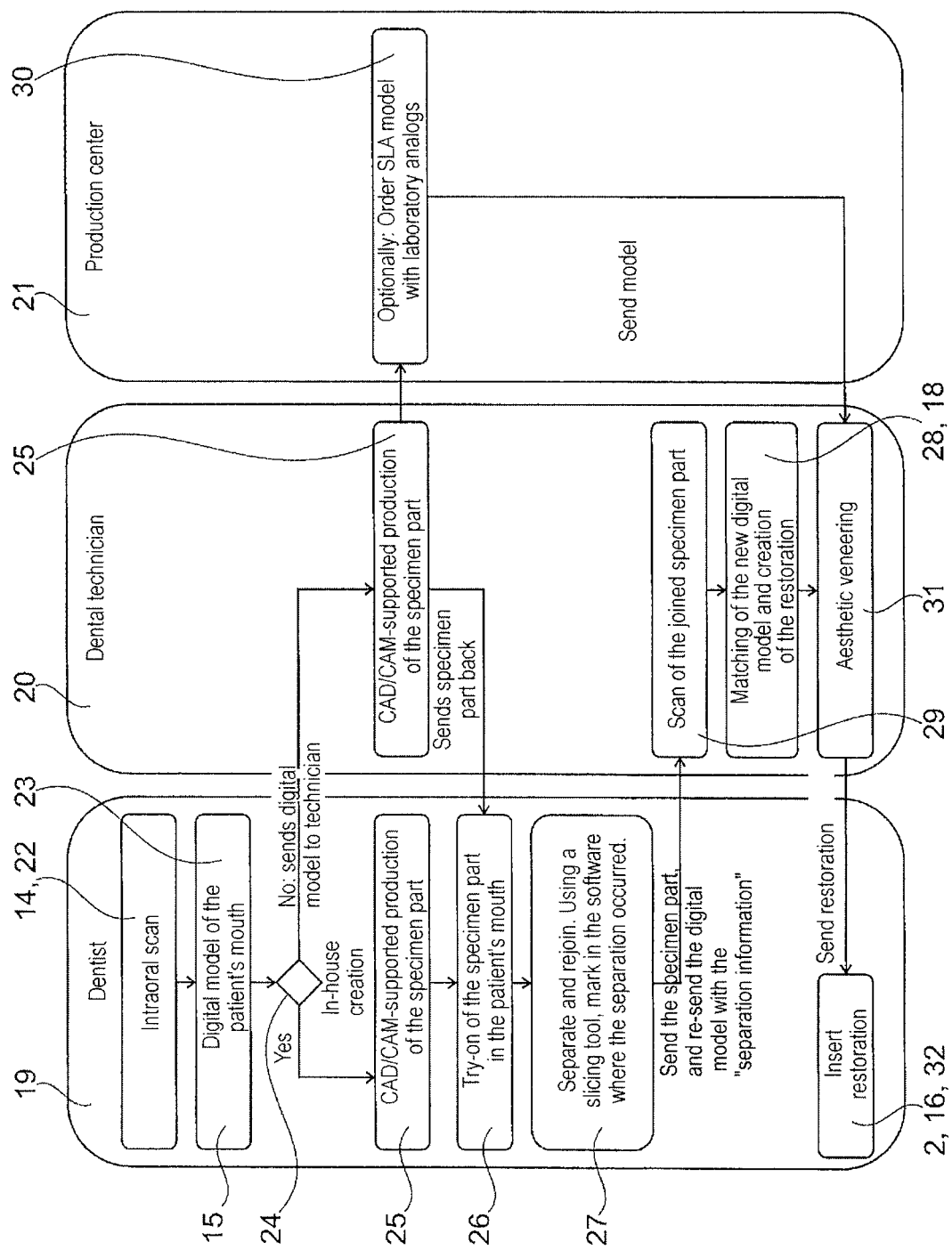
FIG. 1 the work flow according to the invention in the creation of the restoration, FIG. 2 a top view of a specimen part according to the invention, and FIG. 3 a top view of a corrected specimen part.

In FIG. 1, the large vertical blocks are assigned to the individual actors, i.e., the dentist, dental technician, and remote production, in the creation of a restoration. The blocks within the large blocks represent actions of the respective actor, wherein the sequence of the actions is indicated by connecting arrows.

The left block 19 thus contains the actions of the dentist, the central block 20 those of the dental technician, and the right block 21 the actions of a remote production site.

In the left block 19, the dentist thus initially creates an intraoral scan 22 of the jaw arches of a patient, from which scan a digital model of the jaw arches 23 is calculated by a program in known fashion. Subsequently, the dentist decides in accordance with the branching 24, whether he will follow the left stem of the branching and generates a CAD model 25 of the specimen part in a program-supported manner and produce it himself. Otherwise, he sends the data set of the digital model of the jaw arches to the dental technician acting in accordance with block 20 for the CAD/CAM-supported creation of the specimen part 25.

In both cases of the branching 24, the manufactured specimen part arrives at block 19 again, for try-on 26 in the patient's mouth. During the try-on, any mechanical stresses are removed by separating and rejoining, and the separating point is marked 27 in the digital model by means of a so-called slicing tool, so that the separating point in the model can be taken into consideration in the correction calculation.

In FIG. 1, the possibly corrected specimen part then returns at block 20 to the dental technician, who scans 28 the corrected specimen part. Alternatively, this scanning process can naturally also be performed with appropriate equipment by the dentist. The result of this scan and of the marked reference positions is then used as the basis for a re-calculation of one or more digital models, such as of the specimen part and/or of the jaw arch, from which a digital model of the restoration is then generated, after a computer-aided matching with the digital design templates, which digital model is finally the basis for the production 29 of the restoration.

After the CAD/CAM-supported creation of the specimen part, branching off from block 25, the data set of the first digital model of the jaw arches can already be handed over to block 21—the remote production—so as—optionally, in parallel—to order and have produced 30 a stereolithographically-created model with laboratory analogs, which model is then aesthetically veneered by the dental technician in block 31.

The restoration finished in this way is sent to the dentist for insertion 32.

As can be seen easily, this work flow advantageously dispenses with the creation of the customary master model. With appropriate equipment, all actions can also be performed at the dentist's practice.

Figure 2:
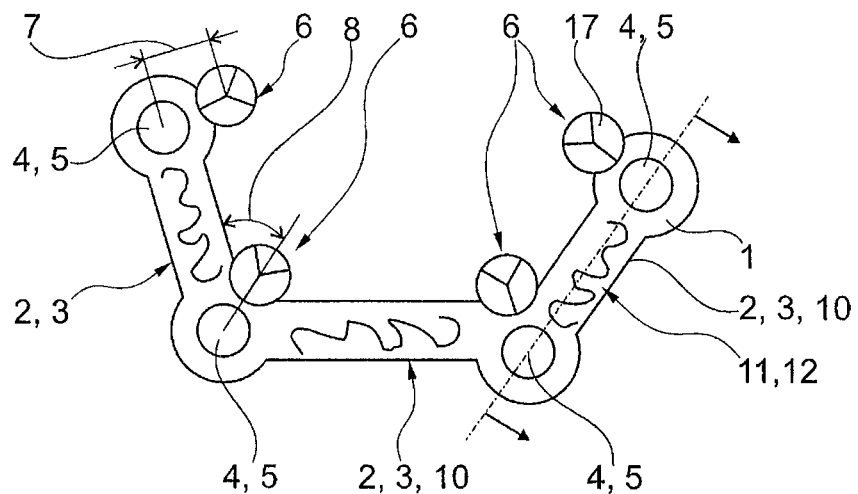
Figure 3:
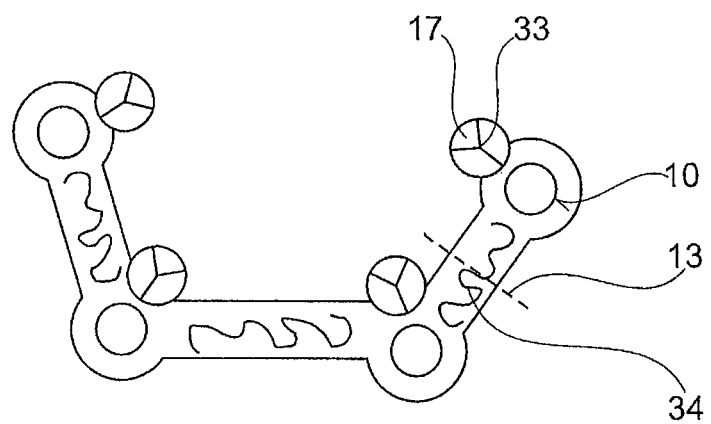

FIG. 2 and FIG. 3 respectively show a top view of the same specimen part 1 according to the invention for testing a jaw arch with a total of four implants 4, which are located below the screw channels 5 during the try-on in the jaw arch. The specimen part 1 is screwed to the implants by means of the screw channels 5. Between the four screw channels 5 are located three bars 3, which can be separated at separating points 13 between the screw holes 5 into individual segments 10, as shown in FIG. 3. Naturally, a specimen part can also consist of only one bar, which connects two implants. Such a simpler specimen part is used for the creation of an implant bridge (FIG. 3). The basic work flow, however, remains the same as for the production of a larger restoration.

Instead of implants, teeth can also be used for anchoring the restoration, which teeth are often ground, in order to then be used as abutments or posts for the mounting of the restoration.

Finally, implants and abutment teeth can also be used in combination for anchoring.

Serving as reference points for the scanning and measuring of the specimen part by the software used are basic shapes 6, which are advantageously shaped as tetrahedrons, so that they can be easily detected. The tip 33 of the basic shape can be precisely marked in the enlarged image of the scan, since its distance 7 and angle 8 as reference values to the implants 4 and/or the screw channels result in a precise pattern that is included in the digital model of the specimen part 1. The change in the position of these scan bodies 17 after separating and rejoining of a bar can be used as a correction vector in the calculation of a corrected digital model of the specimen part.

In addition, a linear milled structure 12 aids as second structure 11, which can be easily used by the software using suitable pattern recognition for the more precise location-dependent correction calculation after the position change, in order to additionally increase the precision.

FIG. 3 indicates a situation in which the specimen part 1 fits on the three left implants, but can only be mounted on the right implant with force. The bar 3 is therefore separated at the separating point 13, and rejoined by cementing after mounting of the right segment 10 on the implant. The digital model of the jaw arch and/or of the specimen part is corrected based upon the correction data determined from a scan, and used as the basis for the construction and production of the restoration.

The specimen part according to the invention and the method according to the invention can, particularly advantageously, be used commercially in the precise and rapid production of aesthetic restorations of teeth.

REFERENCE SYMBOLS

1 Specimen part
2 Implant bridges
3 Bridge bars
4 Implant
5 Screw channel
6 Basic shape
7 Distance
8 Angle
9 Tetrahedron
10 Segment
11 Second structure
12 Milled structure
13 Separating point
14 Intraoral scan
15 Model of the jaw arch?
16 Restoration
17 Scan bodies
18 Scanning
19 Left block
20 Central block
21 Right block
22 Creation of an intraoral scan
23 Creation of a digital jaw arch model
24 Branching
25 CAD/CAM-supported production of the specimen part
26 Try-on of the specimen part
27 Correction of the specimen part and marking of the separating point 28 Scanning and creation of the digital model of the corrected specimen part
29 CAD and production of the restoration
30 Ordering and manufacturing of an SLA model with laboratory analogs
31 Aesthetic veneering of the restoration
32 Insertion of the restoration
33 Tip

The invention claimed is:

1. A specimen part for creating a stress-free fit of implant-supported and/or abutment-supported bridges and bars using a CAD/CAM tool for the creation of restorations, the specimen part comprising:
   one or more screw channels located at one or more ends of the specimen part, the one or more screw channels are adapted for screwing the specimen part to at least one implant,
   a first scannable structure, provided on a bar of the specimen part, the bar is adapted to be located in between two implants or screw channels, the first scannable structure being disposed at a predetermined distance from a center of the two implants or screw channels, said first scannable structure has a scannable basic shape that is provided at a predetermined angle to the at least one implant and/or an abutment, said first scannable structure is configured for correction calculations and said first scannable structure is different from the one or more screw channels,
   the bar has a separating portion, said separating portion disposed between the two implants when the bar is connected to the two implants, wherein the bar is vertically separable at the separating portion into individual segments when the bar is connected to the two implants, and the bar is subsequently adaptable to reduce mechanical stress and to be rejoined at the separating portion to form a corrected specimen part, and
   wherein the predetermined distance and angle provide references that change when the bar is adapted, wherein said changes are a basis for said correction calculations, and
   wherein the specimen part is rejoined at the separating portion by casting or cementing.

2. The specimen part according to claim 1, wherein the first scannable structure is a conical prism.

3. The specimen part according to claim 2, wherein the first scannable structure is a tetrahedron prism.

4. The specimen part according to claim 1, wherein a second scannable structure is provided on the bar.

5. The specimen part according to claim 4, wherein the second scannable structure is a two-dimensional milled structure.

6. The specimen part according to claim 1, wherein the specimen part is produced from a plastic.

7. The specimen part according to claim 6, wherein the plastic is polymethyl methacrylate.

8. The specimen part according to claim 2, wherein the stress-free fit is a passive fit.

9. A method for creating a restoration based on a first digital model of a patient's jaw provided with at least two implants and/or abutments, wherein the first digital model is determined using an intraorally-created scan, the method comprising the steps of:
   fabricating a specimen part from the first digital model using a CAD/CAM device;
   checking the specimen part for dimensional stability with respect to the at least two implants and/or abutments by fitting the specimen part onto the at least two implants in the patient's mouth, and
   correcting the specimen part by (i) separating the specimen part between the at least two implants and/or abutments, (ii) adapting the specimen part to remove or substantially remove mechanical stresses through the step of vertically separating bars of the specimen part so that individual segments result, and (iii) rejoining said individual segments to form a corrected specimen part that has no mechanical stresses or substantially no mechanical stresses;
   scanning the corrected specimen part;
   generating a second digital model as a corrected digital model of the corrected specimen part, and
   generating and manufacturing the restoration using the second digital model.

10. The method according to claim 9, wherein the specimen part is provided with screw channels for each implant.

11. The method according to claim 10, wherein a suitable, scannable basic shape connected to the specimen part is provided at a predetermined distance and angle to each implant and/or abutment.

12. The method according to claim 10, wherein the specimen part is provided with at least one scannable two- or three-dimensional structure.

13. The method according to claim 12, wherein the at least one scannable two- or three-dimensional structure is located on a bar between two implants and/or abutments.

14. The method according to claim 9, wherein the intraorally-created scan is created using scan bodies that have known shapes and/or known dimensions, and are connected to the implants and/or abutments.

15. The method according to claim 9, wherein the scanning of the corrected specimen part takes place extra-orally.

16. The method according to claim 9, further comprising the step of entering a piece of it regarding the position of a separating portion into the first digital model of the specimen part or the second digital model.

17. The method according to claim 9, further comprising the step of creating the restoration at least partially using stereolithographic methods.

18. The method according to claim 9, wherein the rejoining step is achieved by casting or cementing.

* * * * *